United States Patent
Birk et al.

[11] Patent Number: 5,246,398
[45] Date of Patent: Sep. 21, 1993

[54] CLUTCH DISK WITH TORSIONAL DAMPER DEVICE

[75] Inventors: Albert Birk, Bühl-Vimbuch; Michael Bosse, Baden-Baden, both of Fed. Rep. of Germany

[73] Assignee: LuK Lamellen und Kupplungsbau GmbH, Bühl, Fed. Rep. of Germany

[21] Appl. No.: 361,040

[22] Filed: Jun. 5, 1989

[30] Foreign Application Priority Data

Jun. 4, 1988 [DE] Fed. Rep. of Germany ....... 3819067
Jul. 26, 1988 [DE] Fed. Rep. of Germany ....... 3825323

[51] Int. Cl.⁵ .................. F16D 3/12; F16D 3/14
[52] U.S. Cl. ........................... 464/63; 464/64; 464/68; 192/106.2
[58] Field of Search .............. 192/106.2; 464/63, 64, 464/68

[56] References Cited

U.S. PATENT DOCUMENTS

| | | | |
|---|---|---|---|
| 2,314,948 | 3/1943 | Nutt | 192/106.2 |
| 4,368,812 | 1/1983 | Steeg | 464/68 X |
| 4,577,743 | 3/1986 | Raab et al. | 192/106.2 |
| 4,596,324 | 6/1986 | Braun | 192/106.2 |
| 4,634,398 | 1/1987 | Alas | 464/68 |
| 4,669,595 | 6/1987 | Fischer et al. | 464/68 X |
| 4,700,821 | 10/1987 | Maucher et al. | 464/63 X |
| 4,715,485 | 12/1987 | Rostin et al. | 464/68 X |
| 4,813,524 | 3/1989 | Reik | 192/106.2 |

FOREIGN PATENT DOCUMENTS

| | | | |
|---|---|---|---|
| 2107430 | 4/1983 | United Kingdom | 464/68 |
| 2167527 | 5/1986 | United Kingdom | 464/68 |

Primary Examiner—Daniel P. Stodola
Assistant Examiner—William G. Battista, Jr.
Attorney, Agent, or Firm—Peter K. Kontler 29 Claims, 6 Drawing Sheets

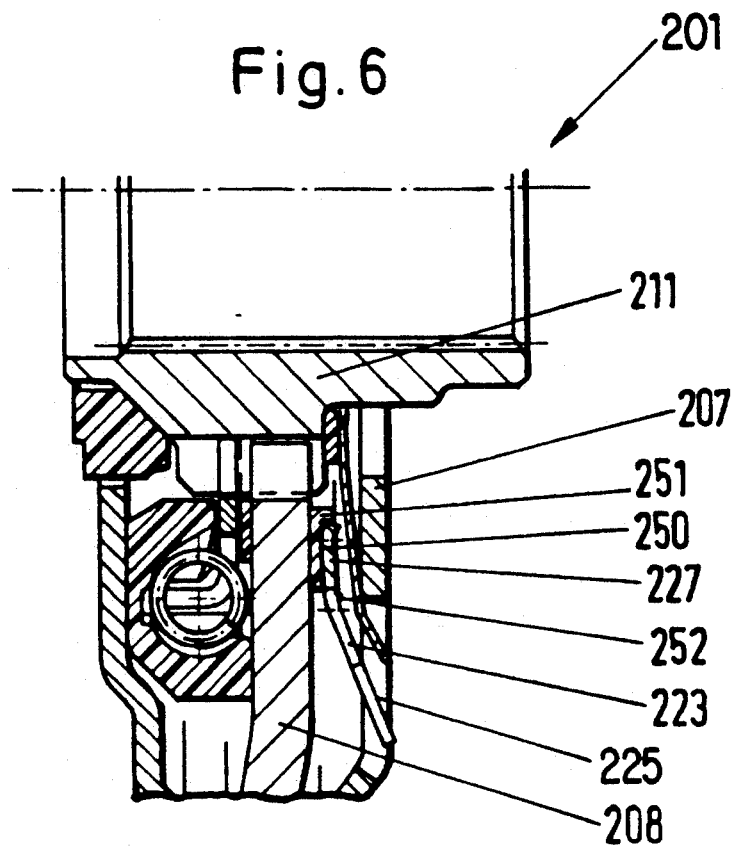

CLUTCH DISK WITH TORSIONAL DAMPER DEVICE

BACKGROUND OF THE INVENTION

The invention relates to torsional vibration damping apparatus in general, and more particularly to improvements in torsional vibration damping apparatus which can be used with advantage in power trains between the engines and variable-speed transmissions of motor vehicles. Torsional vibration damping apparatus of the type to which the present invention pertains can be embodied in or can constitute clutch plates (also called clutch discs) for use in friction clutches of motor vehicles Reference may be had, for example, to French Pat. No. 2 551 813.

OBJECTS OF THE INVENTION

An object of the invention is to provide a torsional vibration damping apparatus which can be used for long periods of time, which can automatically compensate for the absence of exact coaxiality of its parts and which can be used as a less expensive, more compact and longer-lasting substitute for presently known and used torsional vibration damping apparatus.

Another object of the invention is to provide a novel and improved clutch plate or clutch disc for use in friction clutches for motor vehicles.

A further object of the invention is to provide the above outlined apparatus with novel and improved means for reducing wear on its parts and with novel and improved means for damping vibrations and/or other stray movements between its input and output components.

An additional object of the invention is to provide an apparatus which employs or can employ a plurality of dampers but is nevertheless at least as compact as conventional torsional vibration damping apparatus.

Still another object of the invention is to provide a novel and improved method of assembling the constituents of the above outlined apparatus.

A further object of the invention is to provide a power train, particularly for use in motor vehicles, which embodies the above outlined torsional vibration damping apparatus.

An additional object of the invention is to provide a novel and improved input component and a novel and improved output component for use in the above outlined torsional vibration damping apparatus.

Another object of the invention is to provide the apparatus with novel and improved dampers as well as with novel and improved connections between the dampers and other constituents of the apparatus.

A further object of the invention is to provide novel and improved resilient means for use in the above outlined apparatus.

An additional object of the invention is to provide a friction clutch which embodies the above outlined torsional vibration damping apparatus.

SUMMARY OF THE INVENTION

One feature of the present invention resides in the provision of an apparatus for damping torsional vibrations in the power train of a motor vehicle. The improved apparatus can constitute or can be embodied in a so-called clutch plate or clutch disc which is used in friction clutches of motor vehicles to transmit torque between the output shaft of the engine and the input shaft of the variable-speed transmission when the friction clutch is engaged.

The improved apparatus comprises a rotary input component which includes two axially spaced apart substantially disc-shaped parts (hereinafter called walls), a rotary output component including a hub having a toothed external profile, and a first damper operating between the two components and including an input member, an output member and first energy storing means having a first stiffness and operating between the input and output members. The output member of the first damper is non-rotatably secured to the hub, and the apparaus further comprises a second or main damper which also operates between the two components and includes an input element, a substantially flange-like output element having a toothed internal profile in mesh with the external profile of the hub and permitting limited angular movements of the output element and the hub relative to each other, and second energy storing means having a greater second stiffness and operating between the input and output elements. The output element of the second damper is disposed between the walls of the input component, and the first damper is disposed at one side of the output element. The improved apparatus further comprises two axially stressed diaphragm springs between the other side of the output element of the second damper and one of the walls, and means for non-rotatably coupling the diapgrahm springs to the one wall. The coupling means preferably comprises form-locking connections between the one wall and the diaphragm springs.

One of the diaphragm springs operates between the hub and the input component in the axial direction of the hub, and the other diaphragm spring operates between the input component, the output element and the output member in the axial direction of the hub. The arrangement is preferably such that the diaphragm springs are disposed one behind the other in the axial direction of the hub, and one of the diaphragm springs can at least partially overlap the other diaphragm spring in the radial direction of the hub.

In accordance with a presently preferred embodiment, the coupling means includes substantially radially outwardly extending projections on the diaphragm springs, and the one wall is then provided with socket means for such projections. The socket means includes at least one recess (e.g., an aperture in the one wall) which receives a projection of the one diaphragm spring as well as a projection of the other diaphragm spring.

Each diaphragm spring further comprises an annular main portion, and the projections can extend substantially radially inwardly or outwardly from such main portions of the respective diaphragm springs. The diaphragm springs can further comprise additional projections which extend substantially radially inwardly or outwardly from the respective main portions and yieldably bear (directly or indirectly) against the one wall.

The other diaphragm spring can be in direct frictional engagement with the output element of the second damper to produce a frictional damping action. Alternatively, the apparatus can include friction generating means which is interposed between the other diaphragm spring and the output element of the second damper. Such friction generating means can include a washer which is in direct contact with the other diaphragm spring. Means can be provided to locate the washer with reference to the other diaphragm spring in the radial direction of the hub. The main portion of the other diaphragm spring has a peripheral surface and an internal surface, and the locating means can include at least one protuberance which is provided on the washer and extends substantially axially of the hub to engage at least one surface of the main portion of the other diaphragm spring.

The annular main portion of the one diaphragm spring can be disposed adjacent the external profile of the hub, and such apparatus can further comprise friction generating means interposed between the external profile and the main portion of the one diaphragm spring which latter can be in direct contact with the friction generating means.

A plastic insert can be provided between at least one of the diaphragm springs and the one wall of the input component. Such insert can be provided with at least one opening through which at least one projection of the coupling means extends toward the one wall of the input component. The plastic insert can constitute or resemble a washer with an annular bead which is acted upon by a portion of the one diaphragm spring in the axial direction of the hub. The bead can be provided with a conical or convex surface, and the aforementioned portion of the one diaphragm spring includes projections which are provided on the diaphragm spring and contact and extend substantially tangentially of the convex surface.

The inner diameter of the main portion of one of the diaphragm springs can be smaller than the inner diameter of the main portion of the other diaphragm spring.

The other wall of the input component is adjacent the first damper, and the apparatus can further comprise a friction generating ring between the other wall and the hub. Means can be provided to non-rotatably connect the ring to the other wall, and the ring can be provided with a substantially conical first surface which diverges axially of the hub in a direction from the other wall toward the external profile of the hub. The hub of such apparatus is preferably provided with a second surface which is adjacent the first surface. One of the diaphragm springs is operative to bias the first surface against the second surface. The second surface is or can be at least substantially complementary to the first surface. The ring is preferably mounted with limited freedom of radial movement relative to the hub against the opposition of at least one of the diaphragm springs. To this end, the ring can be provided with a substantially cylindrical internal surface and the hub can be provided with a substantially cylindrical external surface having a diameter which is somewhat smaller than the diameter of the cylindrical internal surface of the ring. The difference between the two diameters can be between 0.4 and 2.5 mm. The cylindrical external surface can be provided on an annular axial extension of the hub, and the latter is preferably provided with a toothed internal profile which is adjacent the extension as seen in the axial direction of the hub.

The input member of the first damper can include or constitute a ring which is made of or contains a plastic material. The apparatus preferably comprises means for non-rotatably connecting the input member with the output element. The input member can be provided with pockets for the first energy storing means. The output member of the first damper can include or constitute a ring which is disposed between the input member and the output element. The first energy storing means of such apparatus can include a plurality of resilient elements (e.g., in the form of coil springs) which extend substantially tangentially of the input member. A plastic insert can be disposed between the output member and the output element. The output member can be provided with a toothed internal profile which meshes with the external profile of the hub without any or with minimal play in the circumferential direction of the hub.

Another feature of the invention resides in the provision of an apparatus for damping torsional vibrations, particularly an apparatus which constitutes or forms part of a clutch plate or clutch disc for use in friction clutches of motor vehicles. The apparatus comprises a rotary input component, a rotary output component, energy storing means operating between the two components in the circumferential direction of the components, at least one frictional damping device between the two components, and two substantially disc-shaped parts which are rotatable relative to each other. The damping device includes at least one diaphragm spring which is stressed in the axial direction of the two components and operates between the disc-shaped parts, and means for non-rotatably coupling the at least one diaphragm spring to one of the disc-shaped parts. The at least one diaphragm spring includes an annular main portion and projections which extend substantially radially from the main portion and are adjacent the one disc-shaped part. The at least one diaphragm spring is in frictional engagement with the other disc-shaped part, and the apparatus further comprises an insert between the one disc-shaped part and the projections of the at least one diaphragm spring. The insert preferably consists of or contains a plastic material, such as polyamide or polytetrafluoroethylene. This insert can be provided with a substantially convex surface, and the projections of the at least one diaphragm spring abut and preferably extend substantially tangentially of the convex surface. The convex surface can be provided on an annular bead of the insert, and such bead can have a substantially cuneiform cross-sectional outline.

The coupling means can comprise additional projections which are provided on the at least one diaphragm spring to alternate with the aforementioned projections in the circumferential direction of the two components. The one disc-shaped part is provided with sockets which receive the additional projections. The insert can be provided with openings for the additional projections so that such additional projections can extend through the openings of the insert and into the sockets of the one disc-shaped part.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWING

FIG. 6 is a fragmentary axial sectional view of a third apparatus.

DESCRIPTION OF PREFERRED EMBODIMENTS

Figure 1:
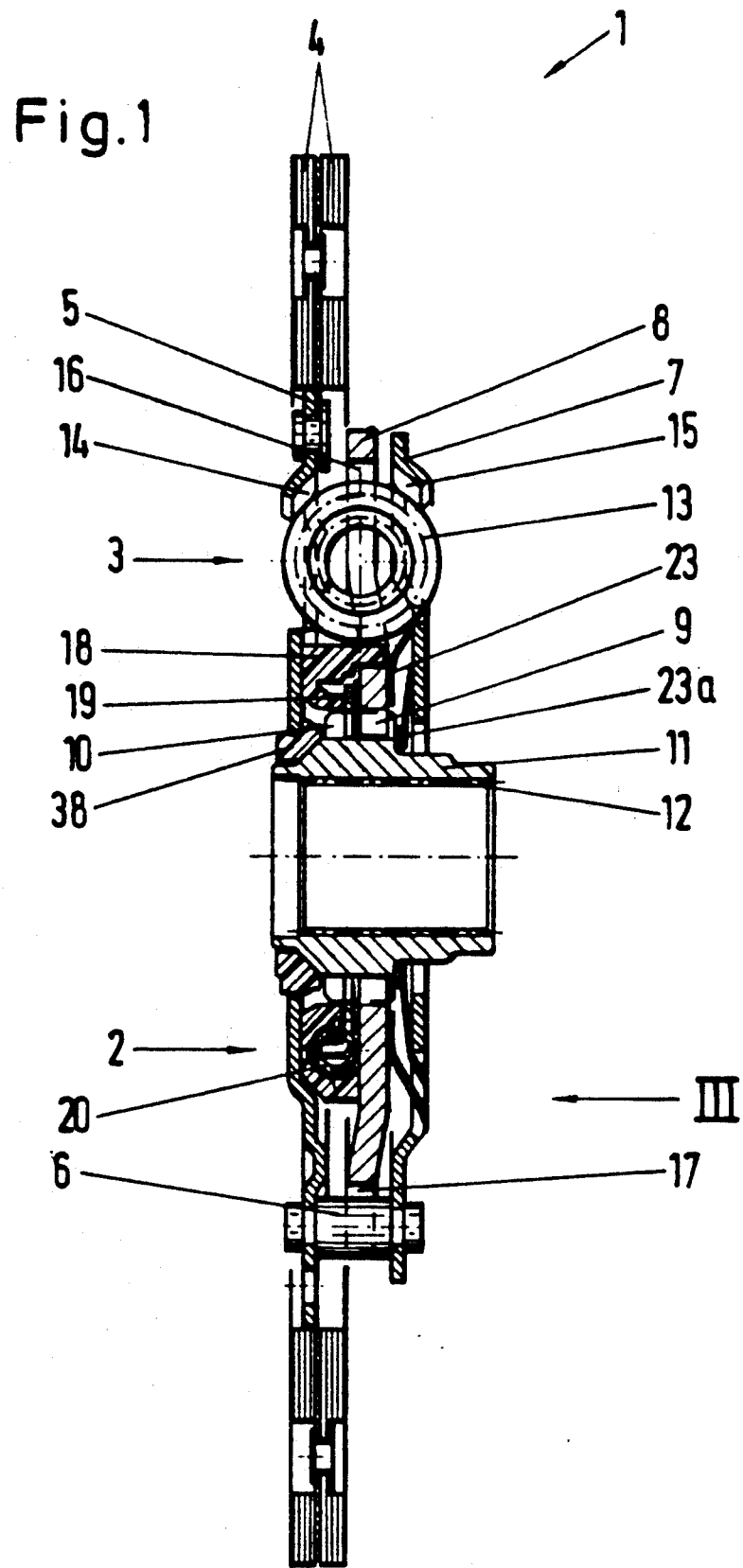
FIG. 1 is an axial sectional view of an apparatus which embodies one form of the invention and constitutes a clutch plate or clutch disc for use in friction clutches of motor vehicles.

The apparatus 1 which is shown in FIGS. 1 to 4 serves to damp torsional vibrations and constitutes a clutch plate or clutch disc for use in the friction clutch of a motor vehicle, e.g., a friction clutch of the type disclosed in commonly owned U.S. Pat. No. 4,813,524 granted Mar. 21, 1989 to Reik.

The improved apparatus 1 comprises a first damper 2, a second or main damper 3, an input component including two axially spaced apart disc-shaped parts 5, 7 (hereinafter called walls for short) and rivet-shaped axial distancing elements 6 between the two walls, and an output component including a hub 11. The input component 5-7 further constitutes the input element of the second damper 3. The wall 5 carries two sets of friction linings 4 which are clamped between a flywheel and a pressure plate when the friction clutch embodying the apparatus 1 is engaged to transmit torque from the output shaft (e.g., a crankshaft) of an internal combustion engine and the input shaft of a variable-speed transmission in the power train of a motor vehicle. The distancing elements 6 maintain the walls 5 and 7 at a fixed distance from each other in the axial direction of the hub 11, and they also serve to hold the walls 5 and 7 against any angular movement relative to each other.

The output element 8 of the second damper 3 is a flange which has a toothed internal profile 9 in mesh with a toothed external profile 10 of the hub 11. These profiles mate in such a way that the hub 11 and the output element or flange 8 have a certain freedom of angular movement relative to each other. The extent of angular play between the flange 8 and the hub 11 determines the range of operation of the first damper 2. The hub 11 is further provided with a toothed internal profile 12 which can mate with the complementary toothed external profile of the input shaft of the aforementioned variable-speed transmission in the power train of a motor vehicle.

The damper 3 further comprises relatively stiff energy storing coil springs 13 which are received in windows 14, 15 of the walls 5, 7 as well as in windows 16 of the flange 8 so that they yieldably oppose annular movements of the input and output elements (5-7 and 8) of the damper 3 relative to each other. The extent of angular movability of the flange 8 and walls 5, 7 relative to each other (against the resistance of the coil springs 13) is determined by the length of arcuate cutouts 17 which are provided in the peripheral surface of the flange 8 and through which the distancing elements 6 extend between the walls 5 and 7.

The first damper 2 is installed between the wall 5 and the flange 8 and comprises a plastic input member 18, a metallic output member 19, and a set of relatively soft energy storing coil springs 20 which operate between the members 18 and 19. The plastic material of the input member 18 is preferably reinforced with glass fibers and/or in any other suitable way. The members 18, 19 are rings, and the latter can be made of metallic sheet material. The output member 19 of the damper 2 is non-rotatably connected to the hub 11, i.e., to the output component of the apparatus 1. The extent of angular movability of the input member 18 and output member 19 relative to each other is terminated by the play between the internal profile 9 of the flange 8 and the external profile 10 of the hub 11. Angular movements of the members 18, 19 relative to each other are yieldably opposed by the energy storing coil springs 20.

Figure 2:
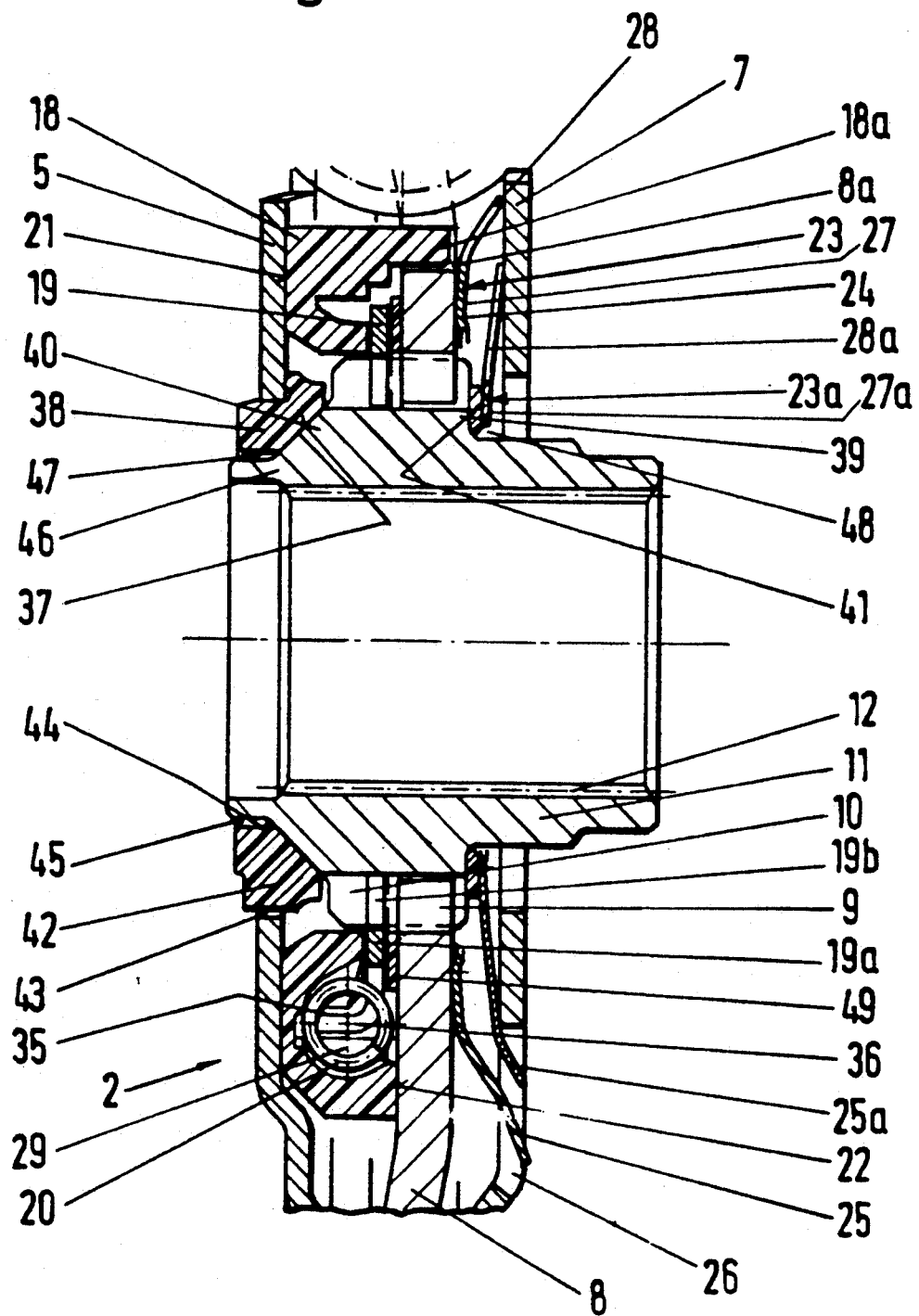
FIG. 2 is an enlarged view of a detail in the apparatus of FIG. 1.
Figure 3:
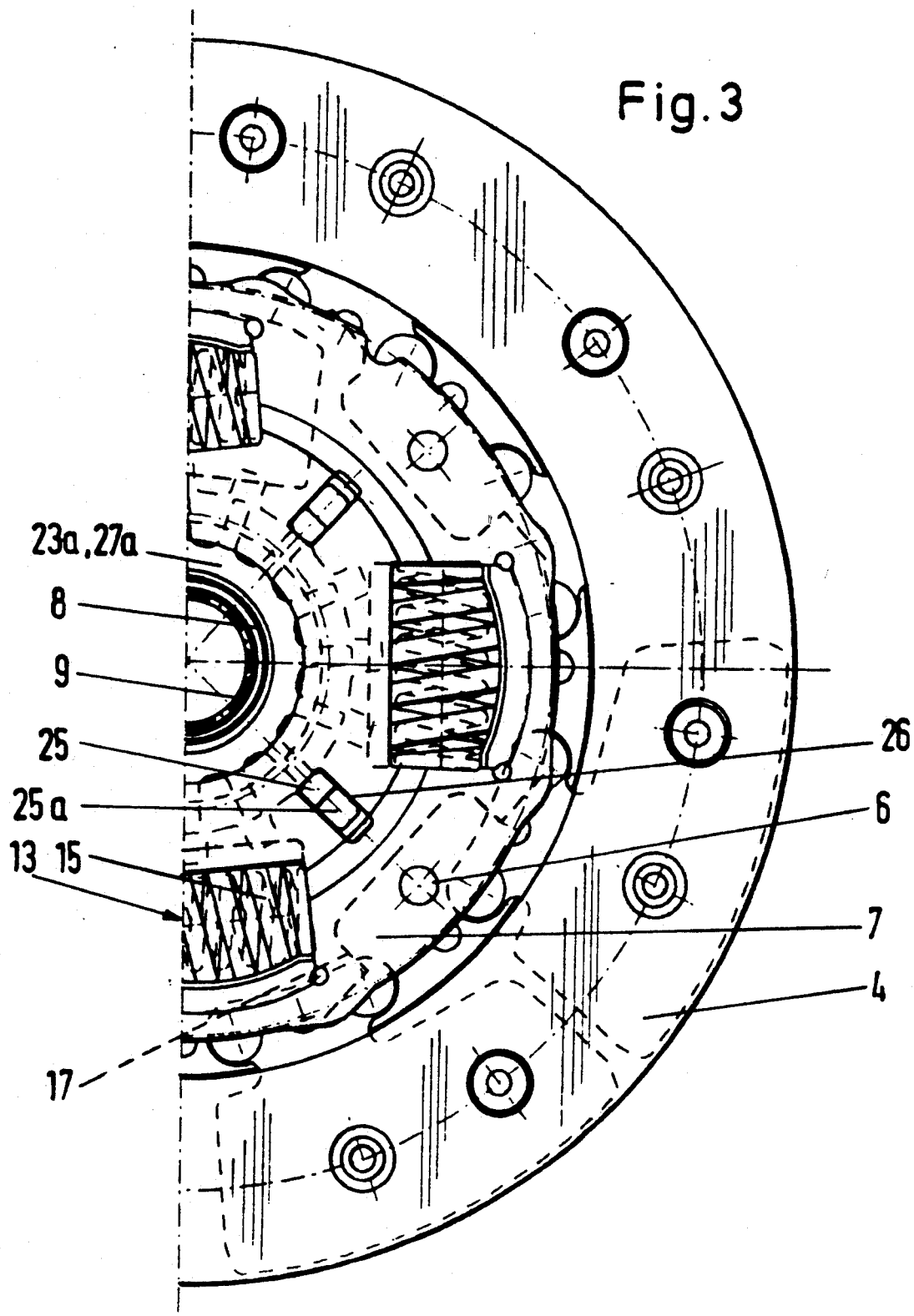
FIG. 3 is a fragmentary elevational view as seen in the direction of arrow III in FIG. 1.
Figure 4:
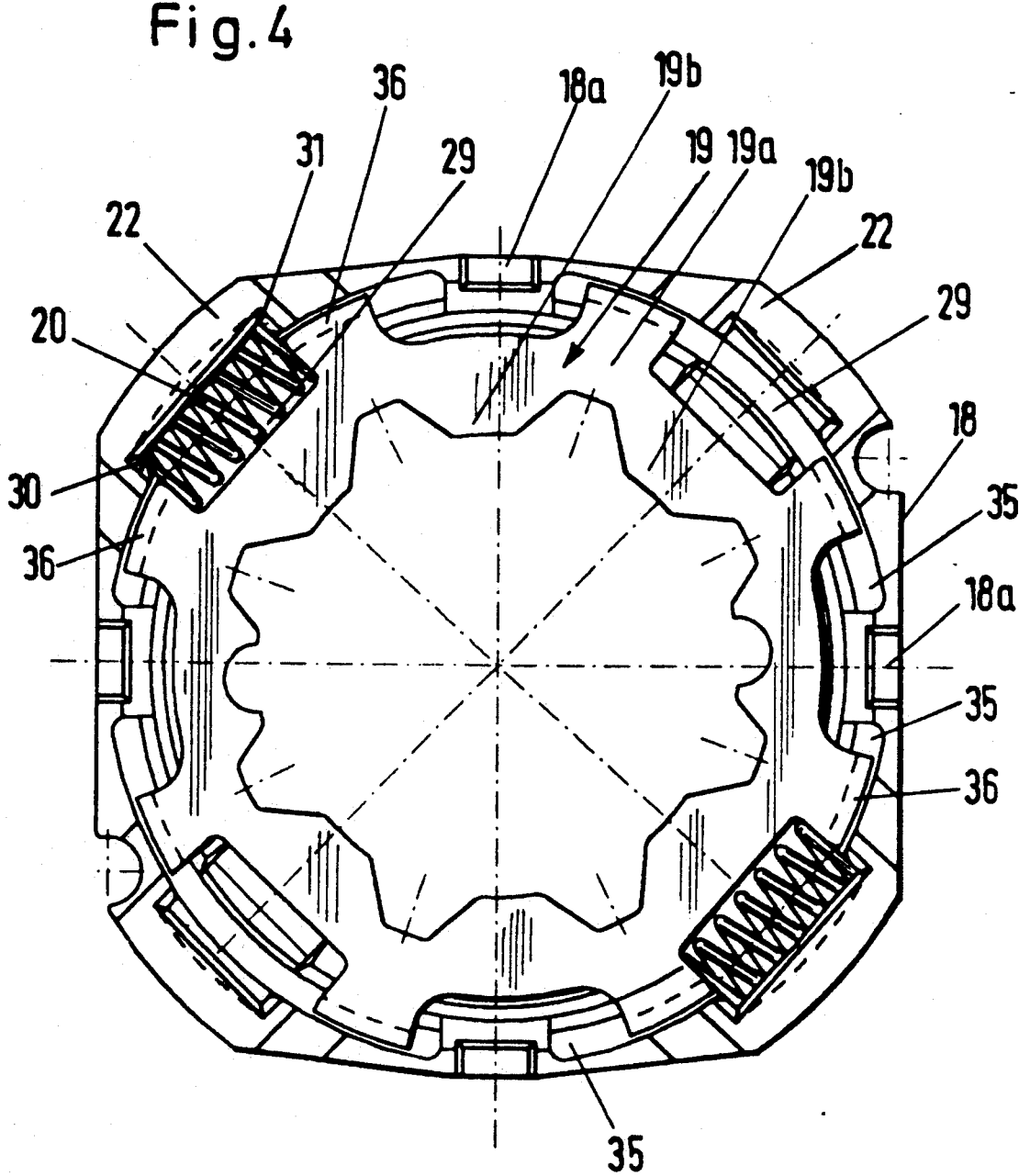
FIG. 4 is an enlarged elevational view of the first damper in the apparatus of FIGS. 1 to 3, substantially as seen in the direction of arrow III in FIG. 1.

As can be seen in FIGS. 2 and 4, the ring-shaped input member 18 of the damper 2 has a first major surface 21 confronting the wall 5 and a second major surface 22 confronting the adjacent side of the flange 8. The other side of the flange 8 is adjacent two diaphragm springs 23 and 23a which are installed in stressed condition between this flange and the wall 7. The diaphragm spring 23 reacts against the wall 7 and bears against the flange 8 so that the latter is biased axially in a direction toward the wall 5. This entails that the input member 18 of the damper 2 is axially clamped between the wall 5 and the flange 8.

The annular main portion 27 of the diaphragm spring 23 includes an inner portion 24 which has a slightly convex surface abutting the adjacent portion of the flange 8. The diaphragm spring 23 further comprises projections 25 in the form of arms or prongs which extend substantially radially outwardly from the annular main portion 27 and constitute the male elements of a coupling which serves to non-rotatably and form-lockingly secure the diaphragm spring 23 to the wall 7. To this end, the wall 7 is provided with sockets in the form of openings or cutouts 26 for the radially outermost portions of the projections 25. The diaphragm spring 23 further comprises additional projections 28 in the form of prongs or arms which alternate with the projections 25 and bear directly against the inner side of the wall 7. The diaphragm spring 23 is axially stressed between the flange 8 (which is engaged by the portion 24 of annular main portion 27) and the wall 7 (which is engaged by the additional projections 28). The additional projections 28 of the illustrated diaphragm spring 23 are shorter than the projections 25 of the means for non-rotatably coupling the diaphragm spring 23 to the wall 7.

The diaphragm spring 23a is installed in axially stressed condition between the hub 11 (output component of the apparatus 1) and the wall 7. This diaphragm spring comprises projections 25a which extend radially outwardly from its annular main portion 27a and serve to non-rotatably couple the diaphragm spring 23a to the wall 7. To this end, portions of the projections 25a extend into openings of the wall 7, preferably into the aforementioned sockets 26 for the projections 25 of the diaphragm spring 23. Additional projections 28a of the diaphragm spring 23a resemble or constitute arms or prongs which alternate with the projections 25a and bear against the inner side of the wall 7. The additional projections 28a extend radially outwardly from the main portion 27a of the diaphragm spring 23a and are shorter than the projections 25a.

The annular main portion 27a of the diaphragm spring 23a does not bear directly against the hub 11 because the apparatus 1 comprises a washer-like friction generating plastic insert 39 which is made of a friction generating (but can also be made of friction reducing) material and abuts a radially extending annular shoulder 41 of the hub 11. The shoulder 41 is adjacent one axial end of the toothed external profile 10 of the hub 11. In fact, a portion of the shoulder 41 overlies the adjacent axial ends of teeth which constitute the external profile 10.

The axially stressed diaphragm spring 23a operates between the hub 11 and wall 7 by urging the wall 7 axially of the hub 11 and away from the toothed external profile 10 to thereby clamp a ring-shaped second plastic insert 38 between the wall 5 and the hub 11. The insert or ring 38 is also made of a friction generating (or friction reducing) plastic material and has a conical surface 40 which diverges axially of the hub 11 in a direction from the wall 5 toward the external profile 10. The hub 11 has a complementary conical surface 37 which is engaged by the conical surface 40 under the action of the wall 5, i.e., as a result of axial stressing of the diaphragm spring 23a between the wall 7 and the hub 11. The abutting conical surfaces 37 and 40 of the hub 11 and ring 38 center the input component 5-7 relative to the output component (hub) 11 of the apparatus 1 in the radial direction of the hub under the action of the stressed diaphragm spring 23a. In other words, the conical surfaces 37 and 40 cooperate to ensure that the walls 5, 7 and the parts which are secured thereto are coaxial with the hub 11 as a result of mounting of the diaphragm spring 23a in axially stressed condition.

In order to reduce the likelihood of development of a clearance between the ring 38 and the wall 5 (for example, as a result of movement of the wall 5 and ring 38 relative to each other, the apparatus 1 preferably comprises means for non-rotatably connecting the ring 38 to the wall 5. The illustrated connecting means comprises protuberances 42 which are distributed in the circumferential direction of and are integral with the ring 38 and each of which extends into a socket or recess 43 (e.g., a cutout) of the wall 5.

As shown in the upper half of FIG. 2, those portions of the ring 38 which alternate with the protuberances 42 have a substantially L-shaped cross-sectional outline. FIG. 2 further shows that a radial clearance or play 47 is established between the substantially cylindrical internal surface 44 of the ring 38 and the adjacent cylindrical or substantially cylindrical external surface 45 on an annular extension 46 of the hub 11. This extension is adjacent the respective axial end of the toothed internal profile 12 of the hub 11. The purpose of the clearance or play 47 between the ring 38 and the extension 46 of the hub 11 is to permit centering of the group of parts including the walls 5 and 7 relative to the hub 11, at least when the friction linings 4 on the wall 5 are not clamped between a flywheel and a pressure plate of the friction clutch which embodies the apparatus 1, i.e., when the friction clutch is not engaged.

An additional radial clearance or play 48 is established between the internal surface of the annular main portion 27a of the diaphragm spring 23a and the adjacent cylindrical external surface of the hub 11 in the region of the aforediscussed washer or insert 39. The clearance 48 is at least as wide but preferably wider than the clearance 47.

It has been found that, in most instances, the clearance 47 between the ring 38 and the extension 46 of the hub 11 need not exceed 0.9 mm and should not be less than 0.4 mm. In other words, the diameter of the internal surface 44 of the ring 38 should exceed the diameter of the external surface 45 on the extension 46 by between 0.8 and 1.8 mm. The purpose of the surfaces 44 and 45 is to prevent excessive radial shifting of the walls 5, 7 relative to the hub 11 and/or vice versa in response to the application of pronounced radial stresses to the walls 5, 7 and/or upon the hub 11. For example, the application of pronounced radial stresses to the walls 5, 7 could take place during engagement or disengagement of the friction clutch in which the apparatus 1 of FIGS. 1 to 4 is put to use.

The ring-shaped plastic input member 18 of the first damper 2 is non-rotatably connected with the flange 8 (output element of the damper 3) by a form-locking connection including protuberances 18a which extend axially beyond the surface 22 and are received in sockets (e.g., peripheral cutouts) 8a provided in the flange 8. The protuberances 18a further serve to center the input member 18 with reference to the flange 8.

The surface 22 of the input member 18 is provided with pockets 20 for the relatively soft energy storing coil springs 20 of the first damper 2. FIG. 4 shows that the illustrated input member 18 is provided with two pairs of pockets 29 and that the pockets 29 of each pair are disposed diametrically opposite each other. Each pocket 29 extends substantially tangentially of the hub 11, and the length of pockets 29 forming one of the pairs is different from the length of pockets forming the other pair. FIG. 4 further shows that only the two longer pockets 29 receive coil springs 20. If the damper 2 is to constitute a two-stage damper, two additional coil springs are inserted into the two shorter pockets 29 of the input member 18.

FIG. 2 shows that the pockets 29 which receive the coil springs 20 are configurated and dimensioned in such a way that the surfaces bounding these pockets surround at least the major parts of the respective coil springs 20, i.e., such surfaces extend along arcs of more than 180° in the circumferential direction of the coil springs. In fact, the pocket 29 which is shown in FIG. 2 is so deep that it receives nearly the entire coil spring 20. Each of these pockets extends axially in a direction from the surface 22 toward but short of the surface 21 of the input member 18, i.e., the deepmost portions of the pockets 29 are closed in the region of the surface 21.

The surfaces bounding each pocket 29 include pairs of end portions 30, 31 which are adjacent the respective end convolutions of the corresponding coil springs 20.

The input member 18 is further provided with arcuate slots 35 which extend in the circumferential direction of the damper 2 and hub 11 and communicate with the adjacent pockets 29. Such slots are provided in the surface 22 of the input member 18. The depth of the slots 35 (as measured in the axial direction of the hub 11) equals or exceeds the diameters of the springs 20.

The output member 19 of the damper 2 is installed between the input member 18 and the flange 8. The annular inner portion 19a of the output member 19 surrounds the hub 11, and the radially outermost part of the portion 19a is provided with axially extending projections 36 in the form of arms or lugs which are integral parts of the output member 19 and extend into the adjacent arcuate slots 35 of the input member 18. The distribution of lugs 36 in the circumferential direction of the hub 11 is such that they cause the adjacent coil springs 20 of the damper 2 to store energy at least when the input member 18 turns relative to the output member 19 and/or vice versa. As mentioned above, the depth of the slots 35 can exceed the diameters of the springs 20, the same as the length of the lugs 36 (as seen in the axial direction of the hub 11). This ensures that the end convolutions of the springs 20 are properly engaged by the lugs 36 in response to changes of angular positions of the input and output members 18, 19 of the damper 2 relative to each other.

The ring-shaped inner portion 19a of the output member 19 is further provided with radially inwardly extending teeth 19b which mate with the teeth of external profile 10 on the hub 11. The nature of engagement between the teeth 19b and the teeth of the profile 10 is such that the hub 11 and the output member 19 cannot rotate relative to each other but the output member 19 can be moved axially of the hub and/or vice versa.

A further insert 49 in the form of a plastic washer 49 is interposed between the ring-shaped portion 19a of the output member 19 and the flange 8 to prevent direct contact between these metallic parts (however, direct metal-to-metal contact between the flange 8 and the input member 19 of the illustrated apparatus 1 exists between the teeth 19b and the external profile 10).

In order to prevent the development of excessive friction between the input and output members 18, 19 of the damper 2 in response to angular displacement of the flange 8 (which is non-rotatably connected with the input member 18) and the hub 11 (which is non-rotatably connected with the output member 19) relative to each other, the input element 18 is designed in such a way that at least a small axial play is established between the ring-shaped portion 19a of the output member 19 and the insert 49 on the one hand, and the flange 8 on the other hand. FIG. 2 shows that the input member 18 resembles a hood or cap which cooperates with the flange 8 and hub 11 to completely confine the output member 19, i.e., the output member 19 is encapsulated between the parts 8, 11 and 18.

Starting from the neutral positions of the parts of the apparatus 1, the coil springs 20 are first to store energy (or to store additional energy) in response to angular displacement of the input component 5-7 relative to the output component 11 and/or vice versa. Moreover, such angular movement of the input and output components 5-7 and 11 of the apparatus 1 is opposed by the ring 38 and insert 39. When the angular displacement of the input and output components 5-7 and 11 of the apparatus 1 reaches or exceeds the circumferential play between the external profile 10 of the hub 11 and the internal profile 9 of the flange 8, the damping action of the damper 2 is terminated (i.e., this damper is bypassed) so that, if the input and output components 5-7 and 11 of the apparatus 1 continue to change their angular positions relative to each other, the coil springs 13 of the second or main damper 3 begin to store energy or to store additional energy. The damping action of the damper 3 including the coil springs 13 is assisted by the ring 38 and insert 39, and especially by friction between the diaphragm spring 23 and the flange 8 as well as by friction between the plastic input member 18 and the wall 5.

Plastic input members with pockets for coil springs of dampers are disclosed in numerous United States and foreign patent applications of the assignee of the present application.

An important advantage of the improved torsional vibration damping apparatus 1 is that its parts can be assembled in a simple and time-saving manner. Thus, in order to assemble the improved apparatus, the diaphragm springs 23, 23a are placed adjacent the wall 7 so that their projections 25, 25a extend into the respective sockets 26. This establishes a form-locking connection between the wall 7 and the two diaphragm springs, i.e., the diaphragm springs cannot turn relative to the wall 7. In addition, this ensures that the diaphragm springs 23, 23a are properly centered in the radial direction of the wall 7. This obviates the need for radial adjustment of the diaphragm springs 23, 23a during a later stage of the assembling operation.

The feature that the diaphragm spring 23 serves to bias the wall 7 and the flange 8 axially and away from each other as well as to bias the flange 8 against the output member 19, and that the diaphragm spring 23a operates between the wall 7 and the hub 11 also exhibits a number of important advantages. Thus, such mode of operation of the diaphragm springs 23, 23a ensures that the input and output members 18, 19 of the first damper 2 as well as the input and output elements 5-7 and 8 of the second damper 3 are secured in optimum positions as seen in the axial direction of the hub 11. In addition, such mounting and such mode of operation of the diaphragm springs 23 and 23a contribute to compactness of the apparatus 1. Compactness is also enhanced in that the diaphragm springs 23 and 23a are disposed substantially axially one behind the other and in that one of these diaphragm springs at least partially overlaps the other diaphragm spring in the radial direction of the hub 11.

While it is within the purview of the invention to provide the wall 7 with a first set of sockets (26) for the projections 25 of the diaphragm spring 23 and with a discrete second set of sockets for the projections 25a of the diaphragm springs 23a, the illustrated design (wherein each socket 26 receives a projection 25 as well as a projection 25a) is preferred at this time because it contributes to simplicity of the apparatus 1 and enhances the stability of the wall 7. The sockets 26 alternate with the windows 15 of the wall 7, as seen in the circumferential direction of the hub 11. As mentioned above, the windows 15 receive portions of energy storing coil springs 13 forming part of the second or main damper 3.

The diaphragm spring 23 and/or 23a can be modified in that the arms 25 and/or 28 of the diaphragm spring 23 and/or the arms 25a and/or 28a of the diaphragm spring 23a can extend radially inwardly of the corresponding annular main portion 27 or 27a. This would merely necessitate a different distribution of sockets 26 or the provision of discrete sets of sockets for the projections 25 and 25a.

The conicity of the annulus of projections 25 and/or 28 of the diaphragm spring 23 can depart from the conicity of the annular main portion 27, and the same holds true for the conicity of the annuli of projections 25a and/or 28a and the conicity of the annular main portion 27a of the diaphragm spring 23a.

Furthermore, the inclination of each projection 25, 28, 25a or 28a may but need not be uniform from end to end. For example, the inclination of the tips of at least some of these projections can depart from the inclination of the remaining major portions of the corresponding projections. The diaphragm spring 23 can be designed and mounted in such a way that its annular main portion 27 exhibits a first conicity, that the totality of major portions of the projections 25 and/or 28 exhibits a different second conicity, and that the totality of tips of the projections 25 and/or 28 exhibits a different third conicity. The same holds true for the diaphragm spring 23a. As a rule, or in many instances, the conicity of the annuli of projections 25, 28, 25a and/or 28a will be more pronounced than that of the respective annular main portions 27, 27a.

The simplicity of the apparatus 1 is enhanced, and the cost of assembling and making this apparatus is reduced, because the diaphragm spring 23 is in direct metal-to-metal engagement with the wall 7. However, and as will be described with reference to FIG. 6, it is within the purview of the invention to provide a friction reducing insert which is installed between the diaphragm spring corresponding to diaphragm spring 23 of FIG. 1 and the adjacent wall corresponding to the wall 7.

The feature that the diaphragm spring 23a acts upon the hub 11 in the region of the toothed external profile 10 exhibits the advantage that a relatively small insert 39 suffices to prevent direct frictional engagement between the spring 23a and the hub 11. The friction coefficient of the material of the insert 39 is selected with a view to ensure the establishment of a preselected optimum resistance to angular movement of the diaphragm spring 23a and the hub 11 relative to each other.

The insert 39 contributes to a pronounced reduction of wear upon the diaphragm spring 23a and hub 11 and thus prolongs the useful life of the entire apparatus. It is of particular importance to reduce wear upon the diaphragm spring 23a which generates frictional hysteresis for the second or main damper 3. The reason is that the spring 23a is subjected to pronounced axial stresses in actual use of the apparatus 1 in a friction clutch for motor vehicles.

FIGS. 1 and 2 show that the inner and/or outer diameter of the diaphragm spring 23 need not be identical with the inner and/or outer diameter of the diaphragm spring 23a. The apparatus 1 employs a diaphragm spring 23 having an inner diameter which is larger than that of the diaphragm spring 23a and an outer diameter which is larger than that of the diaphragm spring 23a.

The insert or ring 38 also contributes to longer useful life of the apparatus 1. It has been found that the beneficial effect of this ring is especially pronounced if the ring is held against rotation with reference to the adjacent wall 5, such as by the provision of the aforediscussed protuberances 42 and complementary sockets 43. It is clear that the protuberances can be provided on the wall 5 to extend into complementary sockets (e.g., openings, recesses or cutouts) of the ring 38.

The ring 38 exhibits the additional advantage that it enables the group of parts including the walls 5, 7 to move radially of the group of parts including the hub 11 when the need for such radial movement arises in actual use of the apparatus 1, particularly in a friction clutch for use in the power train of a motor vehicle. Thus, the diaphragm spring 23a then simply yields and enables the walls 5 and 7 to move radially of the hub 11 when the magnitude of radial forces acting upon the group of parts including the walls 5 and 7 warrants a radial movement rather than eventual damage to or destruction of the apparatus. Pronounced radial stresses upon the hub 11 and/or upon the walls 5, 7 are likely to develop if the output shaft of the engine (such output shaft carries and rotates a flywheel which engages one of the two sets of friction linings 4 in engaged condition of the friction clutch) is not in exact axial alignment with the input shaft of the variable-speed transmission (such input shaft has an externally splined portion which extends into and mates with the internal profile 12 of the hub 11). During engagement of the friction clutch, the group of parts including the walls 5 and 7 attempts to assume a position of exact coaxiality with the input shaft of the transmission, i.e., with the hub 11. In the absence of any possibility of moving the group of parts including the walls 5 and 7 radially relative to the group of parts including the shaft 11, the normally rigidly installed bearing on the hub would be subjected to extensive wear. Extensive wear upon such bearing would cause the group of parts including the walls 5 to 7 to automatically assume a position of eccentricity with reference to the hub 11 as soon as the clutch is disengaged. Therefore, the group of parts including the walls 5 and 7 would run out of true and would cause vibration and the generation of noise in automatic response to disengagement of the friction clutch.

All of the just discussed problems which arise in friction clutches embodying conventional clutch plates are solved by the novel expedient of enabling the group of parts including the walls 5 and 7 to move radially (against the opposition of the diaphragm spring 23a) when the magnitude of radial forces acting upon the walls 5, 7 and/or upon the hub 11 warrants a radial shifting. In other words, the novel mounting of the walls 5, 7 on the hub 11 renders it possible to compensate for possible lack of absolute coaxiality of the output shaft (e.g., a crankshaft) of the engine with the input shaft of the variable-speed transmission. If the magnitude of developing radial forces (e.g., in response to engagement of the friction clutch) necessitates a radial shifting of the walls 5, 7 and hub 11 relative to each other, the diaphragm spring 23a yields and enables the conical surfaces 37 and 40 to slide relative to each other. When the clutch is disengaged (i.e., when the torque-transmitting connection between the friction linings 4 and the output shaft of the engine is interrupted but the hub 11 remains non-rotatably connected to the input shaft of the transmission), the group of parts including the walls 5 and 7 is automatically centered on the hub 11 by the diaphragm spring 23a which causes the conical surface 40 to slide relative to the conical surface 37 until the walls 5 and 7 assume optimum radial positions with reference to the hub. Moreover, the stressed spring 23a thereupon maintains the parts 5, 7 and 11 in optimum positions and yields again only when it becomes necessary to permit a certain amount of radial movement of the walls 5, 7 relative to the hub 11 in order to avoid damage to or destruction of the apparatus 1 or of the entire friction clutch. It has been found that the extent of radial movement of the walls 5, 7 relative to the hub 11 is rather small so that a difference between the diameter of the cylindrical internal surface 44 of the ring 38 and the diameter of the cylindrical external surface 45 of the extension 46 of the hub 11 need not exceed 2.5 mm and can be as small as 0.4 mm. When the walls 5, 7 and tend to move radially of the hub 11 through a distance exceeding half the difference between the diameters of the surfaces 44 and 45, the ring 38 cooperates with the hub 11 to oppose additional radial movements of the walls. Radial forces which tend to cause extensive radial movements of the walls 5, 7 relative to the hub 11 tend to develop for short periods of time during certain stages of operation of the friction clutch, particularly during engagement or disengagement of the friction clutch, especially a friction clutch which is mounted on a composite flywheel with one or more dampers between the elements of the composite flywheel. Reference may be had, for example, to the aforementioned commonly owned U.S. Pat. No. 4,813,524 to Reik. The main reason for the development of short-lasting but pronounced radial forces which act upon the walls 5 and 7 is that the engagement between the friction linings 4 and the adjacent parts (such as the flywheel at one side and the pressure plate of the clutch at the other side of the wall 5) is not uniform all the way around (as seen in the circumferential direction of the wall 5).

The extension 46 of the hub 11 need not be provided with internal teeth, i.e., this extension is adjacent one axial end of the toothed internal profile 12 of the hub 11.

Figure 5:
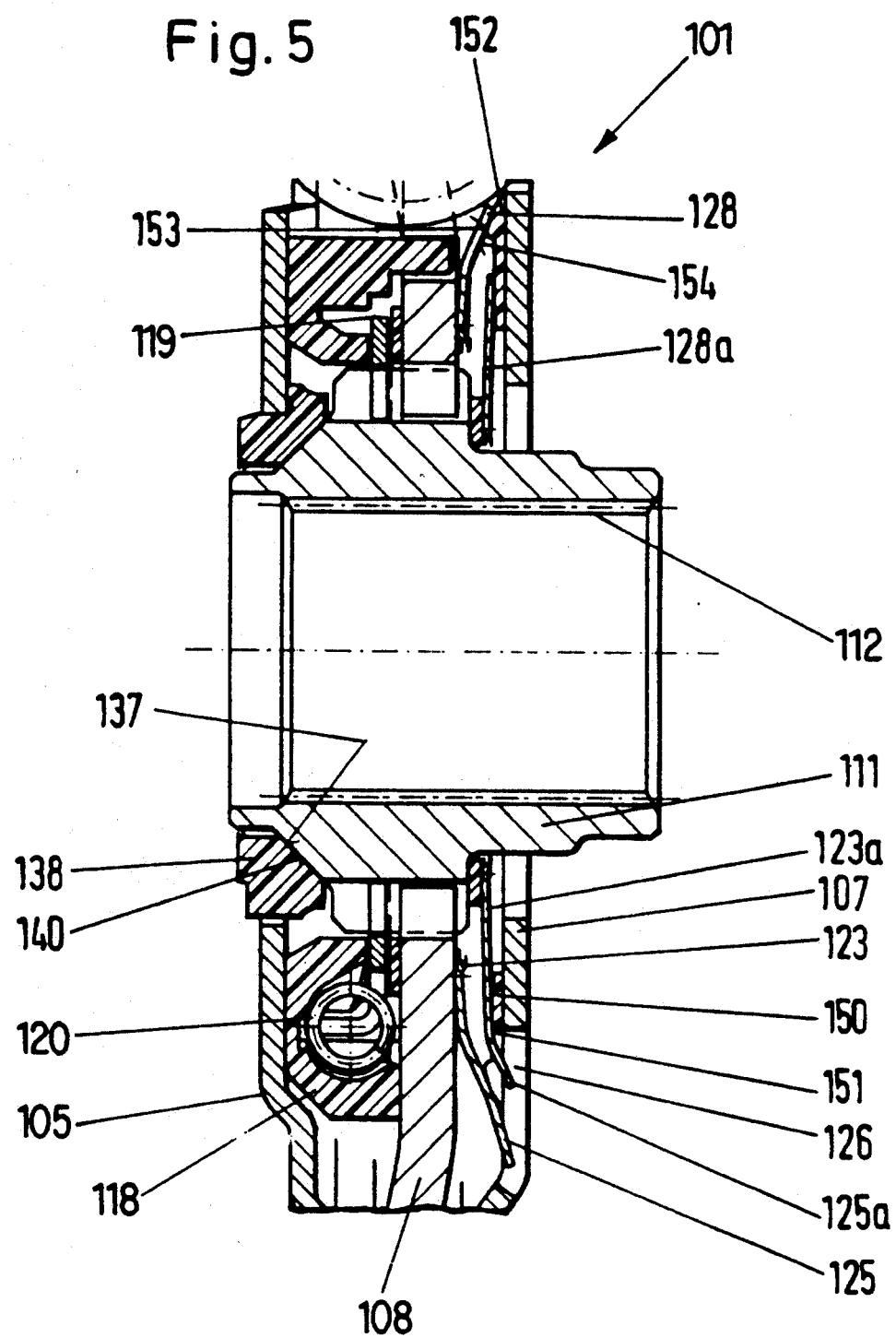
FIG. 5 is a fragmentary axial sectional view of a second apparatus.

FIG. 5 shows a portion of a modified apparatus 101 wherein all such parts which are identical with or clearly analogous to corresponding parts of the apparatus 1 of FIGS. 1 to 4 are denoted by similar reference characters plus 100. The apparatus 101 of FIG. 5 comprises a plastic insert 150 in the form of a washer which is installed between the diaphragm springs 123, 123a and the wall 107. The arrangement is such that one side of the insert 150 is in direct contact with the inner side of the wall 107 and the other side of this insert is engaged by the additional projections 128, 128a of the respective diaphragm springs 123, 123a. The insert 150 is formed with openings in the form of cutouts 151 which register with the sockets 126 of the wall 107 and enable the projections 125 and/or 125a of the coupling means between the diaphragm springs 123, 123a and the wall 107 to extend into the respective sockets 126. FIG. 5 shows that only the projections 125a of the diaphragm spring 123a extend through the openings 151 of the insert 150. However, if the leftward inclination of the projections 125 is increased, they also extend into the openings 151 in order to reach the adjacent sockets 126.

The radially outermost portion of the insert 150 is an annular bead 152 which has a substantially cuneiform cross-sectional outline and has a convex or conical surface 153 which is contacted by the adjacent surfaces 154 of additional projections 128 on the diaphragm spring 123. The configuration of the surface 153 and the inclination of the surfaces 154 is preferably such that the additional projections 128 extend substantially tangentially of the surface 153. Such orientation and configuration of the surfaces 153, 154 is desirable and advantageous because it ensures that changes of conicity of the diaphragm spring 123 and/or radial shifting of the diaphragm spring 123 merely causes the projections 128 to roll along the preferably convex surface 153 of the bead 152 or that the projections 128 can readily slide along the convex surface 153 to avoid extensive wear upon the projections 128 and/or upon the insert 150. The insert 150 also contributes to a reduction of wear upon the wall 107. Changes of conicity of the diaphragm spring 123 and/or radial displacements of this diaphragm spring can take place in the event that the group of parts including the wall 107 and/or the group of parts including the hub 111 is acted upon by pronounced radial forces during certain stages of operation of the friction clutch in which the apparatus 101 of FIG. 5 is used. Such radial stresses can effect a movement of the conical surface 137 of the hub 111 relative to the complementary conical surface 140 of the ring 138 and/or vice versa.

The insert 150 can be used with advantage in the apparatus of FIG. 5 as well as in the apparatus 1 of FIGS. 1 to 4. In addition, such insert can be used in clutch plates which are not provided with a discrete first damper (corresponding to the damper 2 of FIGS. 1 to 4) and/or wherein the flange (corresponding to the flange 8 or 108) is integral with the hub (11 or 111), i.e., with the toothed internal profile (such as 12 or 112) of the hub. The insert 150 greatly reduces the wear upon the wall 107 and upon the diaphragm springs, especially upon diaphragm springs which are designed to produce frictional hysteresis or are designed for higher spring stages and, therefore, are called upon to generate large axial forces.

An advantage of the embodiment which is shown in FIG. 5 is that the insert 150 greatly reduces the wear upon the wall 107, upon the diaphragm spring 123a as well as upon the diaphragm spring 123. This insert does not prevent the projections 125a from extending into the respective sockets 126 of the wall 107 because it is provided with the aforediscussed openings 151. The bead 152 exhibits the advantage that it contributes to a further reduction of wear upon the diaphragm spring 123, namely upon the additional projections 128 of this diaphragm spring. The reason is that the configuration of the bead 152 reduces the likelihood of scraping of additional projections 128 along the convex surface 153.

The provision of the insert 150 between one or more diaphragm springs (such as 123, 123a) on the one hand and the adjacent part (such as 107) of a torsional vibration damping apparatus is of advantage in all or practically all types of torsional vibration damping apparatus. For example, this insert can be used with advantage in clutch plates with discrete first and second dampers (as described with reference to FIGS. 1 to 4) as well as in clutch plates wherein one or more energy storing resilient elements in the form of coil springs or the like operate directly between the input and output components of the clutch plate and a frictional damping device employs at least one diaphragm spring (such as 123 or 123a) acting between two substantially disc-shaped parts (e.g., parts corresponding to the flange 108 and wall 107 of the apparatus of FIG. 5) which can turn relative to each other against the opposition of the at least one diaphragm spring. The at least one diaphragm spring is non-rotatably coupled to one of the disc-shaped parts (e.g., in a manner as shown for the diaphragm spring 123 or 123a and the wall 107 of FIG. 5) and bears upon the other disc-shaped part (such as the flange 108 of FIG. 5). The at least one diaphragm spring can comprise an annular main body (such as 127 or 127a) and projections which extend radially inwardly and/or outwardly from the main portion to react or to bear against the one disc-shaped part. The plastic insert (such as 150) is installed between the one disc-shaped part and the projections of the at least one diaphragm spring and can be made of polyamide, polytetrafluoroethylene or any other suitable material. Such insert can also embody an equivalent of the bead 152 to properly center the insert on the at least one diaphragm spring. Moreover, the bead can be provided with a convex or conical surface for the projections of the at least one diaphragm, preferably in a manner as described hereinbefore in connection with the surface 153 and the surfaces 154 of the projections 128. While it is normally preferred to employ a convex surface 153, it often suffices to provide the bead 152 with a conical surface, i.e., to impart to the web a true cuneiform cross-sectional outline. The surface 153 then forms a ramp for the adjacent surfaces 154 of the projections 128. The surface 153 can have a partly conical and partly convex outline or a semicircular outline.

FIG. 6 shows a portion of a third apparatus 201 which constitutes a modification of the apparatus 101 of FIG. 5. All such parts of the apparatus 201 which are identical with or clearly analogous to the corresponding parts of the apparatus 1 are denoted by similar reference characters plug 200. The apparatus 201 of FIG. 6 comprises a plastic washer-like friction generating insert 250 between the annular main portion 227 of the diaphragm spring 223 and the flange 208. The insert 250 has a ring-shaped axially extending protuberance 251 which overlies the internal surface of the main portion 227 of the spring 223 so that the insert 250 is properly located (centered) with reference to the diaphragm spring 223 in the radial direction of the hub 211. A circumferentially complete annular protuberance 251 can be replaced by a set of two or more discrete protuberances which are spaced apart from each other in the circumferential direction of the hub 211. Each discrete protuberance can constitute a stud, a lobe or an otherwise configurated part which engages the internal surface of the annular main portion 227 to properly center the insert 251 and the diaphragm spring 223 relative to each other.

It is also possible to omit the protuberance 251 or the aforediscussed shorter protuberances and to provide the insert 250 with one or more protuberances which engage the external surface of the annular main portion 227 of the diaphragm spring 223. In addition, reliable centering of the parts 223, 250 relative to each other can be achieved by providing the insert 250 with one or more first protuberances which are adjacent the external surface of the main portion 227 of the diaphragm spring 223 and with one or more protuberances which are adjacent the internal surface of the main portion 227. A protuberance which engages the external surface of the main portion 227 is shown by broken lines, as at 252. The protuberance 252 can consist of several sections which are adjacent the external surface of the main portion 227 in the spaces between neighboring projections 225. The sections of the protuberance 252 can perform the additional function of non-rotatably connecting the insert 250 with the diaphragm spring 223. This ensures that the wear as a result of friction between the diaphragm spring 223 and the insert 250 is zero and that friction develops only between the insert 250 and the flange 208.

It is further possible to omit the protuberance 251 and/or 252 and to center the insert 250 on the flange 208. For example, the insert 250 can be provided with one or more protuberances (not shown) which extend into complementary sockets of the flange 208 to thus center the insert 250 on the flange 208 as well as to prevent angular movements of the parts 208, 250 relative to one another.

An advantage of the apparatus 201 is that any radial displacement of the group of parts including the hub 211 relative to the group of parts including the wall 207 can merely entail a movement of the insert 250 with reference to the diaphragm spring 223 or flange 208 (depending upon whether the insert is centered on the diaphragm spring 223 or on the flange 208). To this end, it is preferred to select the friction coefficient of the material of insert 250 in such a way that friction between the insert and the diaphragm spring 223 or flange 208 is smaller than friction between the wall 207 and the diaphragm spring 223. Thus, the additional projections of the diaphragm spring 223 (such additional projections are not shown in FIG. 6) are in direct metal-to-metal contact with the wall 207; this generates friction which is more pronounced than that between the insert 250 and the diaphragm spring 223 or flange 208. The diaphragm spring 223 and the wall 207 can be made of steel.

The apparatus 201 of FIG. 6 exhibits the advantage that it greatly reduces friction between the diaphragm spring 223 and the wall 207, and more particularly between the additional projections of this diaphragm spring and the inner side of the wall 207.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for damping torsional vibrations in the power train of a motor vehicle, particularly a clutch plate, comprising a rotary input component having two axially spaced apart walls; a rotary output component including a hub having a toothed external profile; a first damper operating between said components and including an input member, an output member, and first energy storing means having a first stiffness and disposed between said input and output members, said output member being non-rotatably secured to said hub; a second damper operating between said components and including an input element, a substantially flange-like output element having a toothed internal profile in mesh with said external profile and permitting limited angular movements of said output element and said hub relative to each other, and second energy storing means having a greater second stiffness and operating between said input and output elements, said output element being disposed between said walls and said first damper being disposed at one side of said output element; two axially stressed diaphragm springs between the other side of said output element and one of said walls; means for non-rotatably coupling said diaphragm springs to said one wall; and a friction generating ring directly engaged by one of said diaphragm springs and bearing against one of said components in the axial direction of said components.

2. Apparatus for damping torsional vibrations in the power train of a motor vehicle, particularly a clutch plate, comprising a rotary input component having two axially spaced apart walls; a rotary output component including a hub having a toothed external profile; a first damper operating between said components and including an input member, an output member, and first energy storing means having a first stiffness and disposed between said input and output members, said output member being non-rotatably secured to said hub; a second damper operating between said components and including an input element, a substantially flange-like output element having a toothed internal profile in mesh with said external profile and permitting limited angular movements of said output element and said hub relative to each other, and second energy storing means having a greater second stiffness and operating between said input and output elements, said output element being disposed between said walls and said first damper being disposed at one side of said output element; two axially stressed diaphragm springs between the other side of said output element and one of said walls; and means for non-rotatably coupling said diaphragm springs to said one wall.

3. The apparatus of claim 2, wherein said coupling means comprises form-locking connections between said one wall and said diaphragm springs.

4. The apparatus of claim 2, wherein one of said diaphragm springs reacts against said hub and bears against said input component in the axial direction of said hub, the other of said diaphragm springs reacting against said input component and bearing against one of the parts including said output element and said output member in the axial direction of said hub.

5. The apparatus of claim 2, wherein said diaphragm springs have portions which are disposed one behind the other in the axial direction of said hub.

6. The apparatus of claim 2, wherein said diaphragm springs at least partially overlap each other in the radial direction of said hub.

7. The apparatus of claim 2, wherein said coupling means includes substantially radially extending projections on said diaphragm springs, said one wall having socket means for said projections.

8. The apparatus of claim 7, wherein said socket means includes at least one recess in said one wall and the projections of both diaphragm springs extend into said at least one recess.

9. The apparatus of claim 7, wherein each of said diaphragm springs further comprises an annular main portion, said projections extending substantially radially outwardly from the respective main portions and said diaphragm springs further comprising additional projections extending substantially radially from the respective main portions and yieldably bearing against said one wall.

10. The apparatus of claim 2, wherein one of said diaphragm springs reacts against said hub and bears against said input component in the axial direction of said hub, the other of said diaphragm springs reacting against said input component and bearing against one of the parts including said output element and said output member in the axial direction of said hub and being in direct frictional engagement with said output element to produce a frictional damping action.

11. The apparatus of claim 2, wherein one of said diaphragm springs reacts against said hub and bears against said input component in the axial direction of said hub, the other of said diaphragm springs reacting against said input component and bearing against one of the parts including said output element and said output member in the axial direction of said hub, and further comprising friction generating means interposed between said other diaphragm spring and said output element.

12. The apparatus of claim 11, wherein said friction generating means includes a washer which is in direct contact with said other diaphragm spring.

13. The apparatus of claim 12, further comprising means for locating said washer with reference to said other diaphragm spring in the radial direction of said hub.

14. The apparatus of claim 2, wherein one of said diaphragm springs reacts against said hub and bears against said input component in the axial direction of said hub, the other of said diaphragm springs reacting against said input component and bearing against one of the parts including said output element and said output member in the axial direction of said hub, said one diaphragm spring having an annular portion adjacent said external profile.

15. The apparatus of claim 14, further comprising discrete friction generating means interposed between said external profile and said annular portion of said one diaphragm spring, said one diaphragm spring being in direct contact with said friction generating means.

16. The apparatus of claim 2, further comprising a plastic insert between one of said diaphragm springs and said one wall.

17. The apparatus of claim 2, further comprising a plastic insert interposed between said diaphragm springs on the one hand, and said one wall on the other hand.

18. The apparatus of claim 2, further comprising a plastic insert between one of said diaphragm springs and said one wall, said coupling means comprising at least one projection on said one diaphragm spring and said insert having an opening through which said one projection extends in the axial direction of said hub.

19. The apparatus of claim 2, further comprising a plastic washer interposed between one of said diaphragm springs and said one wall, said washer having an annular bead and said one diaphragm spring including a portion which bears against said bead.

20. The apparatus of claim 2, wherein each of said diaphragm springs includes an annular main portion having an inner diameter, the inner diameter of one of said main portions being smaller than the inner diameter of the other of said main portions.

21. The apparatus of claim 2, wherein the other of said walls is adjacent said first damper and further comprising a friction generating ring between said other wall and said hub.

22. The apparatus of claim 21, wherein said ring has limited freedom of radial movement relative to said hub against the opposition of one of said diaphragm springs.

23. The apparatus of claim 22, wherein said ring has a substantially cylindrical internal surface.

24. The apparatus of claim 23, wherein said hub has a substantially cylindrical external surface which is surrounded by said internal surface, the diameter of said internal surface being greater than the diameter of said external surface.

25. The apparatus of claim 24, wherein the difference between said diameters is between approximately 0.4 and 2.5 mm.

26. The apparatus of claim 21, wherein said hub has an annular axial extension and said ring surrounds said extension with radial play, said hub further having a toothed internal profile adjacent said extension in the axial direction of said hub.

27. The apparatus of claim 2, wherein said input member is ring-shaped and contains a plastic material, and further comprising means for non-rotatably connecting said input member with said output element, said input member having pockets for said first energy storing means, said output member being ring-shaped and being disposed between said input member and said output element.

28. The apparatus of claim 27, wherein said first energy storing means includes a plurality of resilient elements extending substantially tangentially of said input member and further comprising a plastic insert between said output element and said output member.

29. The apparatus of claim 2, wherein said output member has a toothed internal profile meshing with the external profile of said hub without any or without any appreciable play in the circumferential direction of the hub.

* * * * *